US008930397B2

(12) United States Patent  (10) Patent No.: US 8,930,397 B2
Rambo et al.  (45) Date of Patent: Jan. 6, 2015

(54) MULTI-ROW DATABASE UPDATING FOR ENTERPRISE WORKFLOW APPLICATION

(71) Applicant: Bank of America Corporation, Charlotte, NC (US)

(72) Inventors: Ron G. Rambo, West Coxsaskie, NY (US); Steven A. Walker, North Salt Lake, UT (US)

(73) Assignee: Bank of America Corporation, Charlotte, NC (US)

( * ) Notice: Subject to any disclaimer, the term of this patent is extended or adjusted under 35 U.S.C. 154(b) by 151 days.

(21) Appl. No.: 13/758,735

(22) Filed: Feb. 4, 2013

(65) Prior Publication Data
US 2014/0222872 A1  Aug. 7, 2014

(51) Int. Cl.
G06F 17/30 (2006.01)
(52) U.S. Cl.
CPC .............................. *G06F 17/30345* (2013.01)
USPC ...................................................... 707/769
(58) Field of Classification Search
None
See application file for complete search history.

(56) References Cited

U.S. PATENT DOCUMENTS

| 8,055,609 | B2 | 11/2011 | Chen et al. |
| 2005/0240601 | A1 | 10/2005 | Lyons et al. |
| 2006/0026199 | A1 | 2/2006 | Crea |
| 2008/0294648 | A1* | 11/2008 | Lin et al. ........................ 707/10 |
| 2009/0319581 | A1* | 12/2009 | Seifert ......................... 707/204 |
| 2011/0225118 | A1* | 9/2011 | Wu et al. ...................... 707/608 |
| 2011/0276636 | A1* | 11/2011 | Cheng et al. ................. 709/206 |
| 2013/0110881 | A1* | 5/2013 | Bender ........................ 707/792 |
| 2013/0151491 | A1* | 6/2013 | Gislason ...................... 707/696 |

* cited by examiner

*Primary Examiner* — Wilson Lee
(74) *Attorney, Agent, or Firm* — Michael A. Springs; Moore & Van Allen PLLC; Nicholas C. Russell

(57) ABSTRACT

Embodiments of the invention are directed to a system, method, or computer program product for providing expedited updating of data stored by an entity. Specifically, the invention expedites the updating of data within large quantities of data on database tables. Initially received update data is processed, via multi-row insert, onto in-memory or temporary tables. The update data is staged on a temporary table while the appropriate base table (housing the data to be updated) is determined. Once determined, update data from the temporary table is pointed to the base table. In this way, a massive amount of data updating may occur. This prevents logging and locking associated with adding individual data updates or row updates to the base table independently. Errors are check and processed accordingly. Once updated, the update data on the temporary table is deleted in mass and a check point restart is issued.

24 Claims, 11 Drawing Sheets

MULTI-ROW DATABASE UPDATING FOR ENTERPRISE WORKFLOW APPLICATION

BACKGROUND

Traditional information technology infrastructures for entities usually require several operating environments, vendor resource deployment, authentication repositories and mechanisms, application servers, and databases for storing, indexing, and updating massive amounts of data on a daily bases. All of these systems and processes must work together in order to operate a large entity's information technology and be able to store, index, and manage data received by the entity.

Typically, databases load data received by the entity for indexing continuously in order to keep up with the volume of data an entity receives and/or tracks on a daily bases. Frequently, the data stored by the entity may need to be updated. This may occur for a variety of reason, including mistakes in the loading, changing flags, changes in the information within the rows, or the like.

The process of database loading and updating takes time, central processing units (CPU) away from the infrastructure, logging time, and in some cases has redundancies and locking issues associated with the process.

Therefore, a need exists for an improved database input and database update system that limits the time, memory, and logging required for core input and update functions to be completed and implemented.

BRIEF SUMMARY

The following presents a simplified summary of all embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of all embodiments in a simplified form as a prelude to the more detailed description that is presented later.

Embodiments of the present invention address the above needs and/or achieve other advantages by providing apparatus (e.g., a system, computer program product, and/or other devices) and methods for providing a multi-row database load and update system for faster loading and updating of data within a database framework. Furthermore the system reduces the central processing units (CPU) required for the process as well as limiting logging time and locking issues associated with traditional loading and updating processes.

In some embodiments, the invention provides expedited loading and updating of data to be stored by an entity. In some embodiments, this data may be stored in tables, such as those in relational databases and flat file databases. These tables include sets of data values that are organized into columns and rows. Tables typically have a specified number of columns, but rows may vary. Each row may be identified by the values appearing in a particular column subset with may be identified as a unique key index. In this way, the tables may provide for indexing of data that is searchable and accessible to any individual within the entity.

In some embodiments, the invention provides expedited loading of data to be stored by an entity. In typical enterprise componentized workflow applications requiring entities to load large amounts of data into tables, such as over 100 million data loads per day, parallel processes are being utilized. In this way, multiple loading processes may be occurring simultaneously within an entity in order to load data onto the appropriate destination table. These parallel processes or even single process of loading data directly to a destination table requires logging by the database system, locks held on the destination table, and the like that result in delays or lags, from the initial receipt of data until the data is indexed and searchable by users within an entity.

In some embodiments, the invention provides an improved database insertion. Such that data may be loaded onto a base table quickly, without lag time. In some embodiments, the system may receive data to be loaded onto a table for storing and indexing. This data may come from the entity, vendors, users, customers, or the like associated with the entity desiring to store the data. The system may then utilize in-memory database tables, such as global temporary tables, to stage data prior to inserting the data into destination base tables. Global temporary tables may be visible to all individuals across an entity, but the data within the table may be visible to all of the individuals across the entity or only to the creator that inserted the table.

The data may be associated in rows to be inserted onto the global temporary table. These rows are subsequently processed in groups of units of works. A row, or record or tuple, may represent a single, implicitly structured data. Each row may represent a set of related data, the relation determined by the entity. The relationship may be associated with where the data originated, the type of data, the application associated with the data, the date of the data entry/storage, the business unit within the entity associated with the data, and/or any other relationship that may be determined by the entity. Typically, each row within the table will have a similar structure.

Once the entire unit of work is staged and validated, a final insert may be issued to move the contents of the global temporary table to the destination base table. In some embodiments, this may be done using a Structured Query Language (SQL) statement issuing the manipulation of the contents of the global temporary table to the proper destination base table.

In some embodiments, the invention provides error check and resolution. Specifically, if a Referential Integrity (RI) error occurs during the final insert, than a series of update statements are used to resolve the error and the final insert statement is re-issued.

Next, the unit of work are successfully processed, such that all of the data from the global temporary table is inserted and in rows on the destination base table, the rows of data created on the global temporary table are deleted in mass. A check point restart record is then written and a commit is issued ending the process. This process may be repeated until all the data that needs to be inputted onto a base table for indexing or the like has been processed and is loaded.

In some embodiments, the system provides expedited updating of data stored by an entity. This data may be stored in tables, such as those in relational databases and flat file databases. These tables include sets of data values that are organized into columns and rows. Tables typically have a specified number of columns, but rows may vary. Each row may be identified by the values appearing in a particular column subset with may be identified as a unique key index. In this way, the tables may provide for indexing of data that is searchable and accessible to any individual within the entity.

In some embodiments, the invention may receive updates to data that is stored in base tables or index records. The invention may stage this update data in global temporary tables prior to updating the base table or index record. The data may be stored in rows within a base table. The update data is also processed in rows, such that the update data may be positioned into rows and collectively a group of rows may be processed as a unit of work.

Once the update data is staged and validated, an update is run by joining the global temporary table to the destination base table. In some embodiments, this update is done for marking index records as posted or not posted. In other embodiments, this update is done for updating specific fields, such as account corrections, amount corrections, or the like. As such, the update data is stages onto global temporary tables and, that table is subsequently used to update the destination table. In some embodiments, the updating may include adding new rows to the destination table.

In some embodiments, the invention provides error check and resolution. Specifically, error check and resolution checks for mistakes in the update data, elimination of repeats, confirm proper data to be updated, and the like. In this way, while a high volume of data may be updated daily, this error check ensures that the appropriate data is being updated and correctly processed for indexing.

Next, once all of the update data from the global temporary table is inserted and in rows on the appropriate destination base table, the rows of update data created on the global temporary table are deleted in mass. A check point restart record is then written and a commit is issued ending the process. This process may be repeated until all the update data that needs to be inputted onto a base table for indexing or the like has been processed and is loaded.

Embodiments of the invention relate to systems, methods, and computer program products for updating data within an entity database, the invention comprising: receiving update data for updating original data stored on the entity database, wherein the original data stored on the entity database is stored in base tables and configured in rows; identifying one or more appropriate base tables with the original data that is to be updated; determining a temporary table to store the received update data based at least in part on the appropriate base tables that is identified as storing the original data for updating; inserting update data onto the temporary table, wherein the insertion of the update data is done by multi-row insertion; staging the update data on the temporary table; joining the temporary table with the appropriate base table, wherein joining the temporary table with the appropriate base table transfers the update data from the temporary table to the appropriate base table; confirming that the update data replaced the original data on the appropriate base; and deleting, in mass, the update data from the temporary table based at least in part on confirming that the update data replaced the original data on the appropriate base.

In some embodiments, the temporary table is a global temporary table or in-memory database table that is internal to the entity, wherein the temporary table is created at an initiation of updating data within the entity database, wherein the temporary table is not logged by the entity database.

In some embodiments, the joining the temporary table with the appropriate base table further comprises replacing the original data in the appropriate base table with the update data from the temporary table in mass, wherein the mass data update reduces locking contentions. Furthermore, the joining the temporary table with the appropriate base table further comprises a single insertion statement that inserts the update data from the temporary table onto the appropriate base table.

In some embodiments, the invention further comprises validating the update data when the update data is being inserted onto the temporary table, wherein the validation eliminates locks initiated by the appropriate base table.

In some embodiments, the invention further comprises staging the update data on the temporary table includes tuning the update data, such as altering the size of a unit of work associated with the update data to optimize insertion.

In some embodiments, the update data may be stored in a weekly or daily update file prior to being inserted onto the temporary table, wherein weekly or daily update files provide the timing for inserting the update data onto the temporary table.

In some embodiments, receiving update data for updating original data stored on the entity database further comprises determining contiguous and value ranges to provide updates by section keys.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
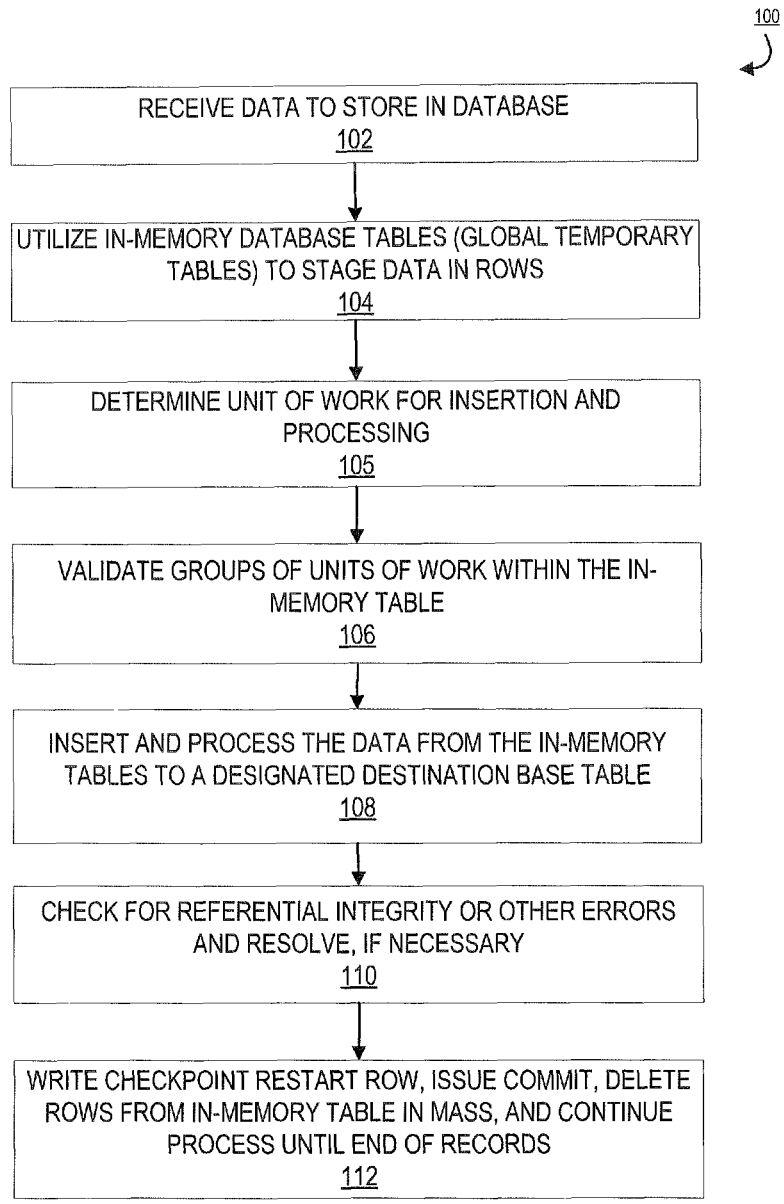
Figure 2:
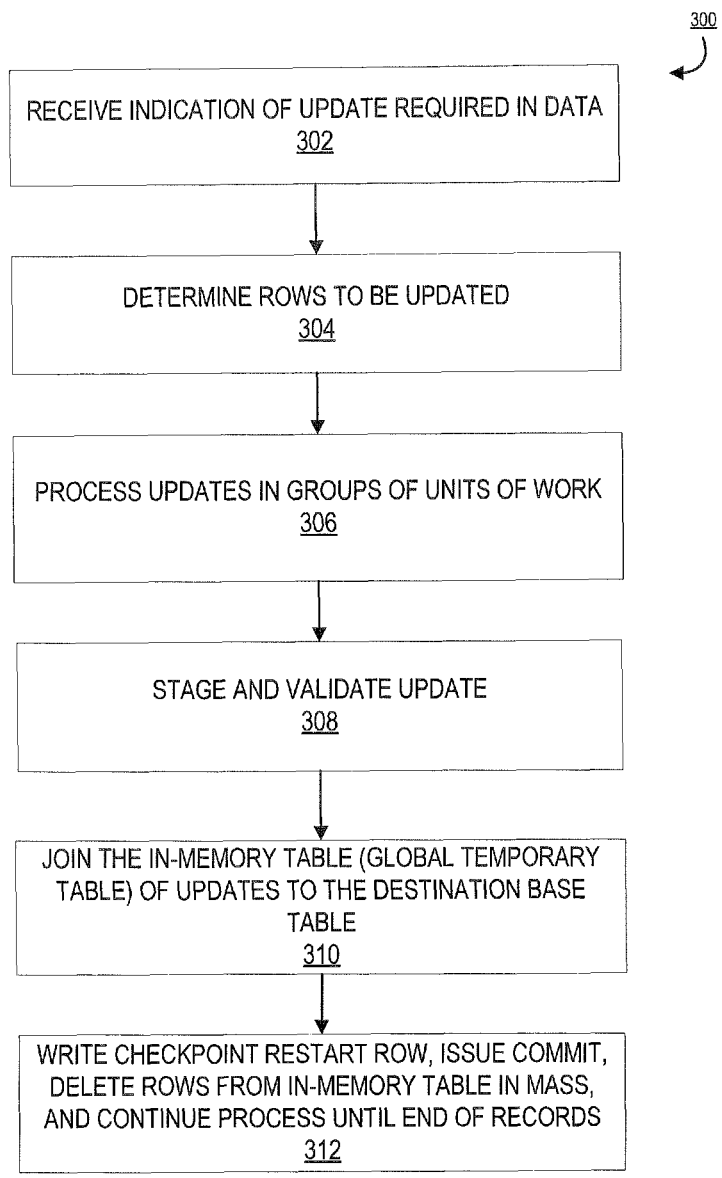
Figure 3:
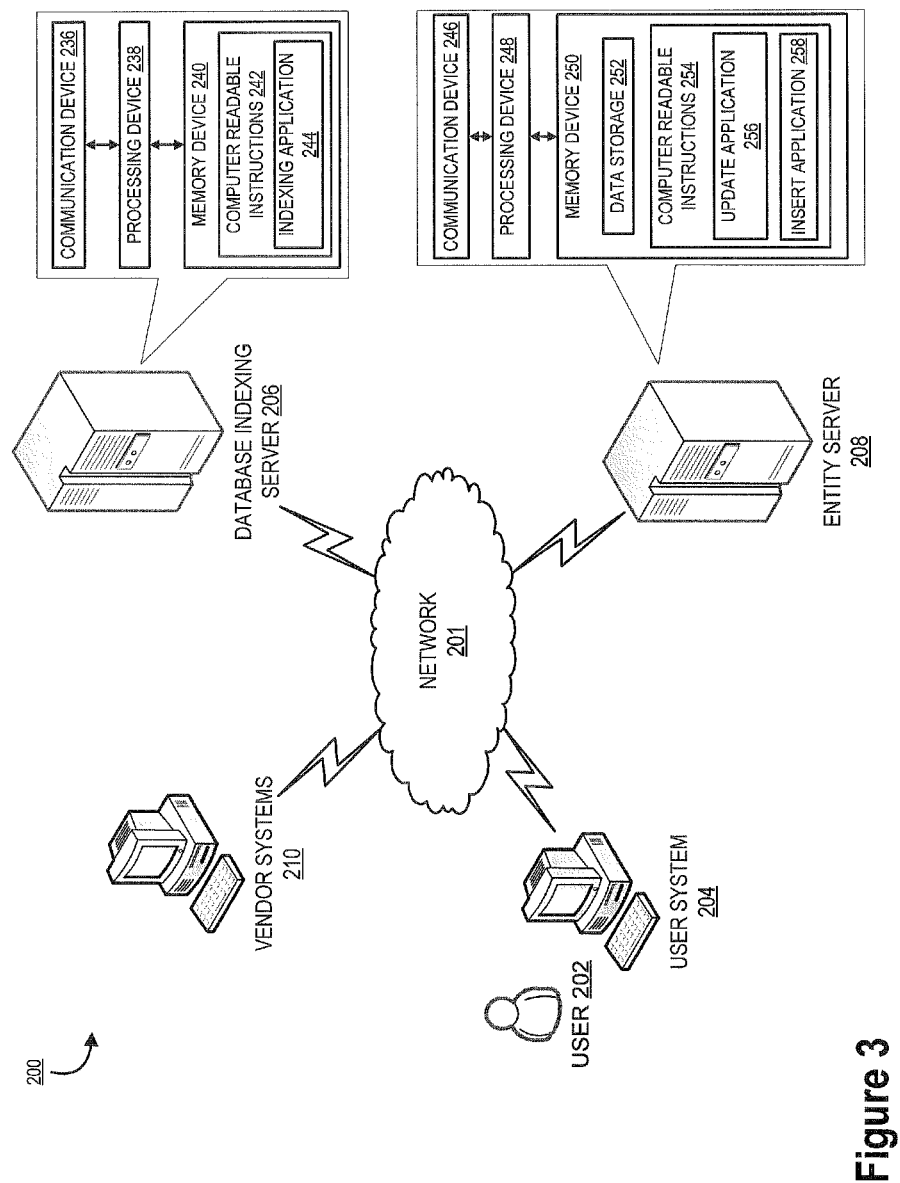
Figure 4:
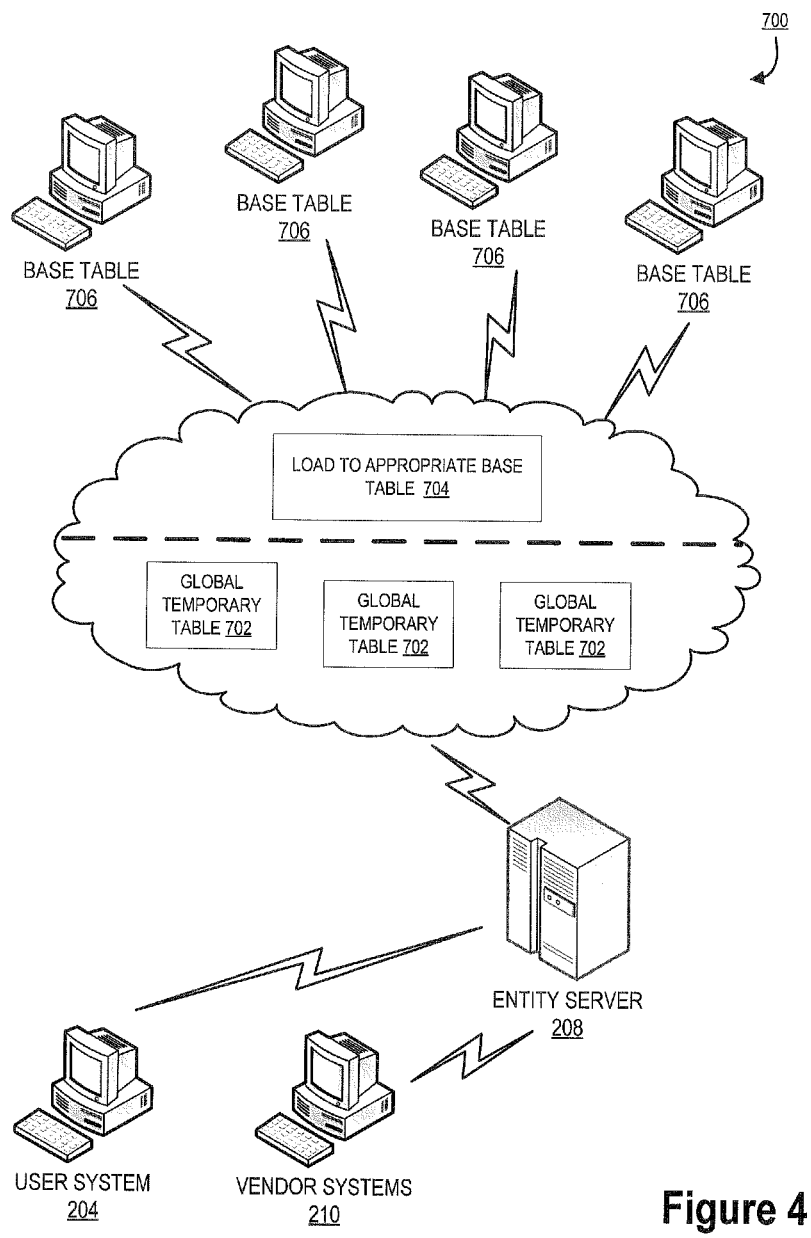
Figure 5:
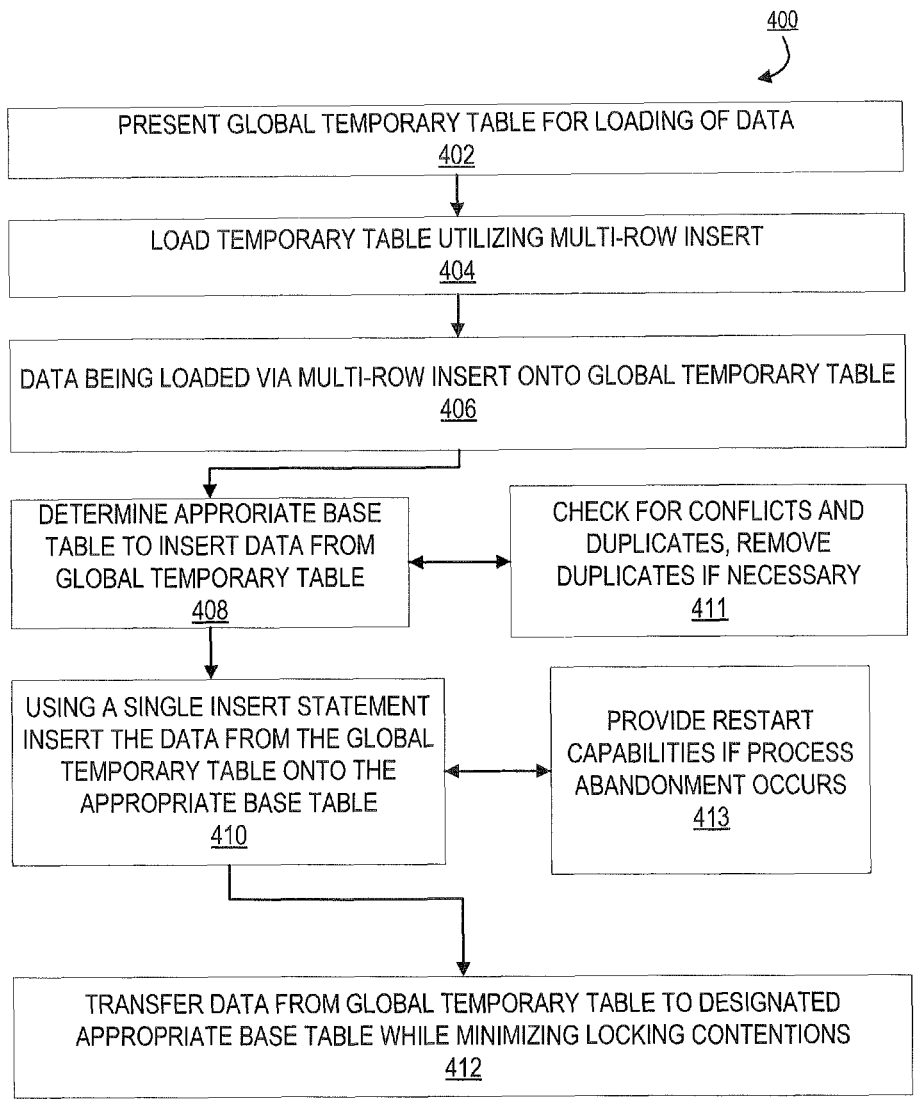
Figure 6A:
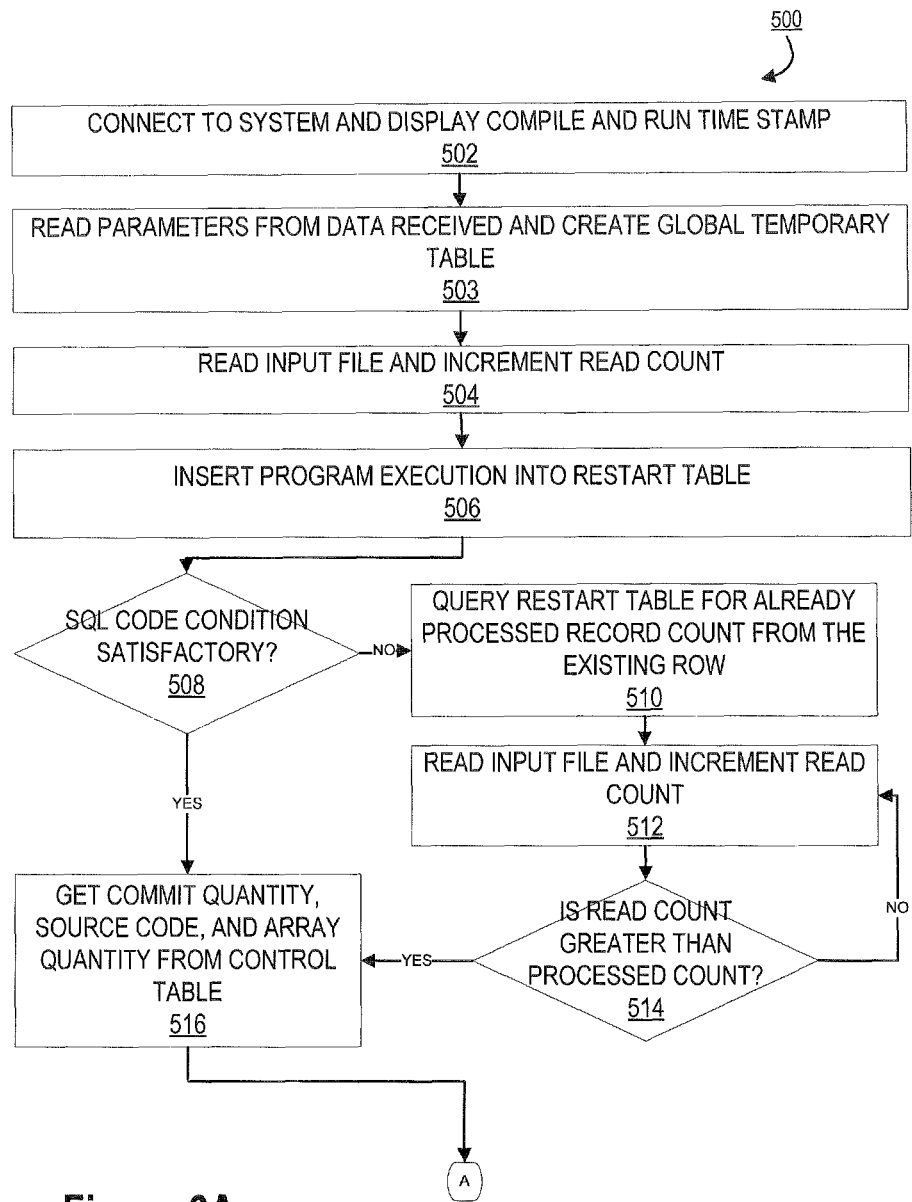
Figure 6B:
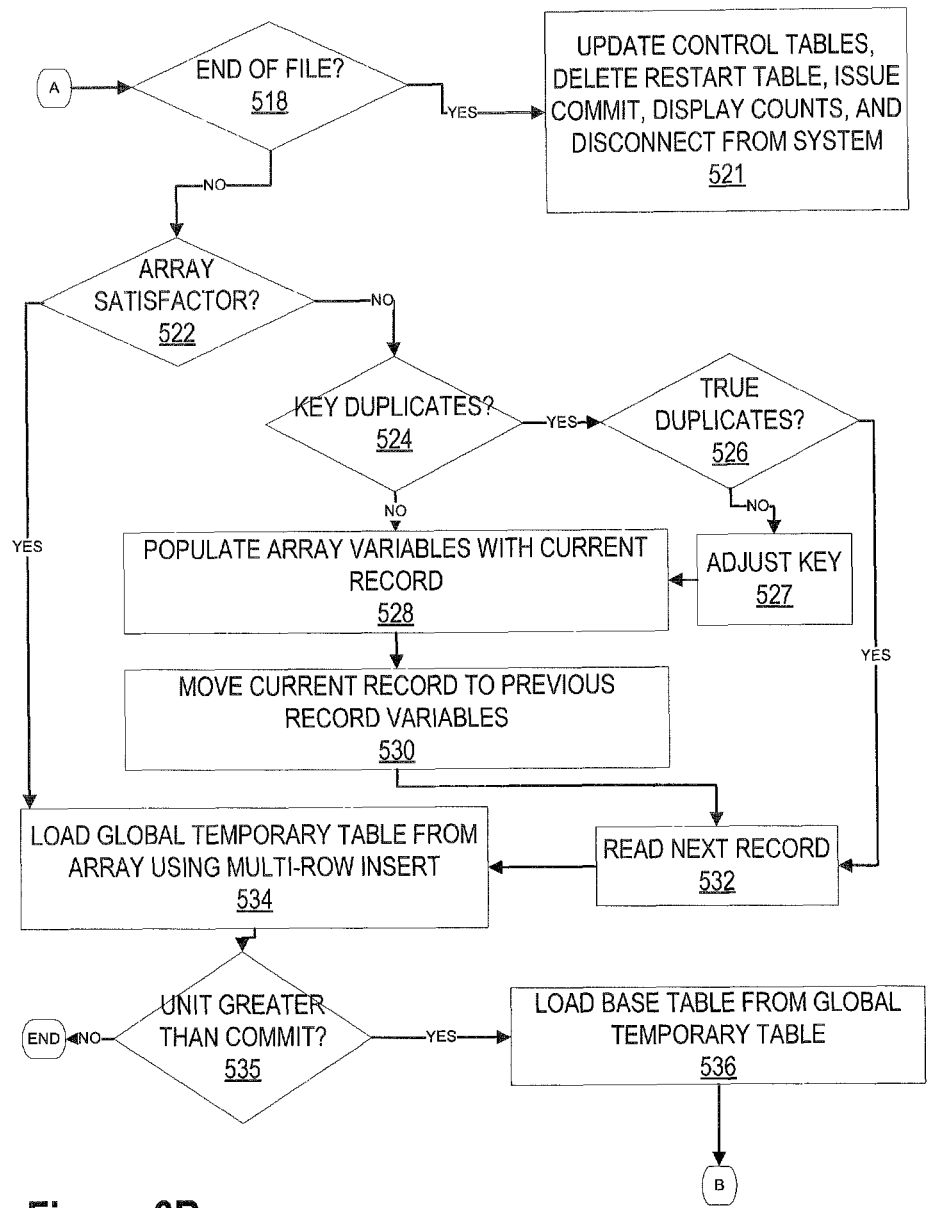
Figure 6C:
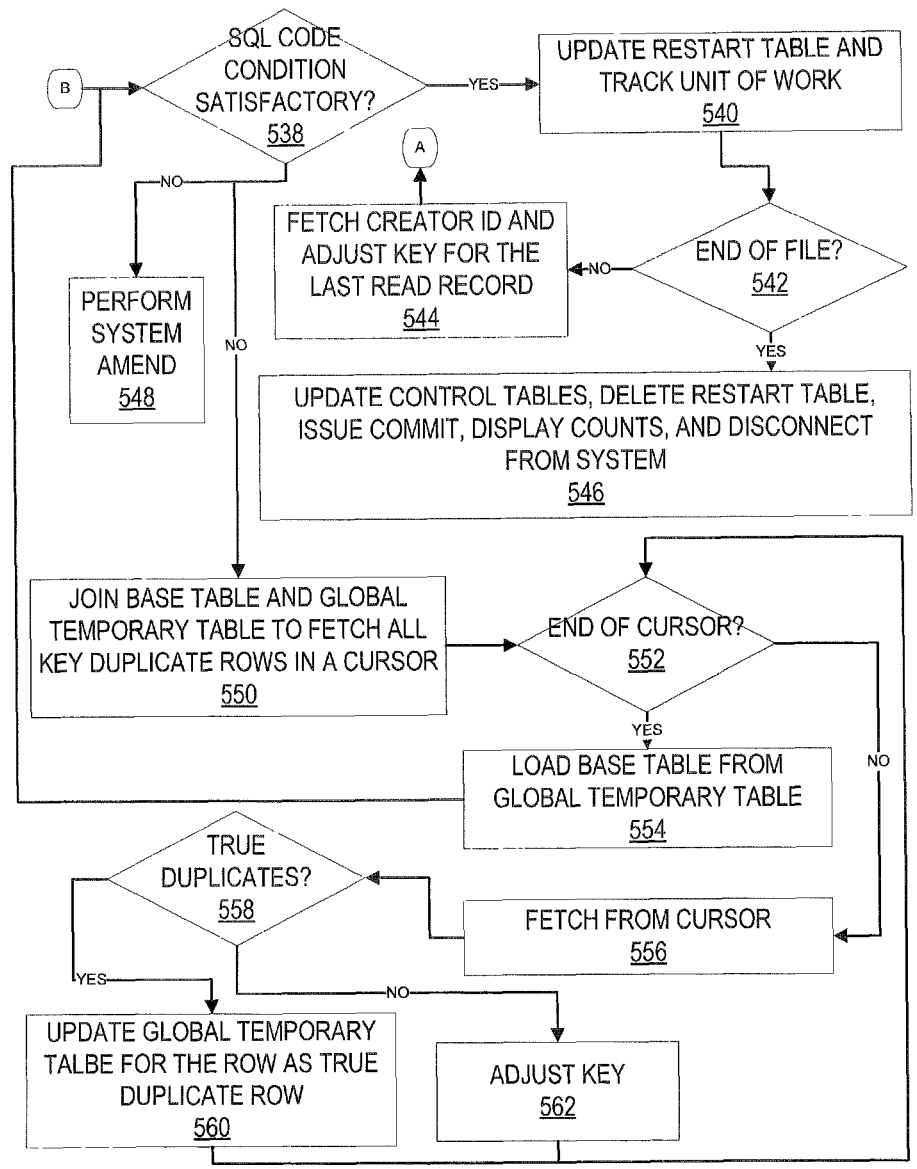
Figure 7:
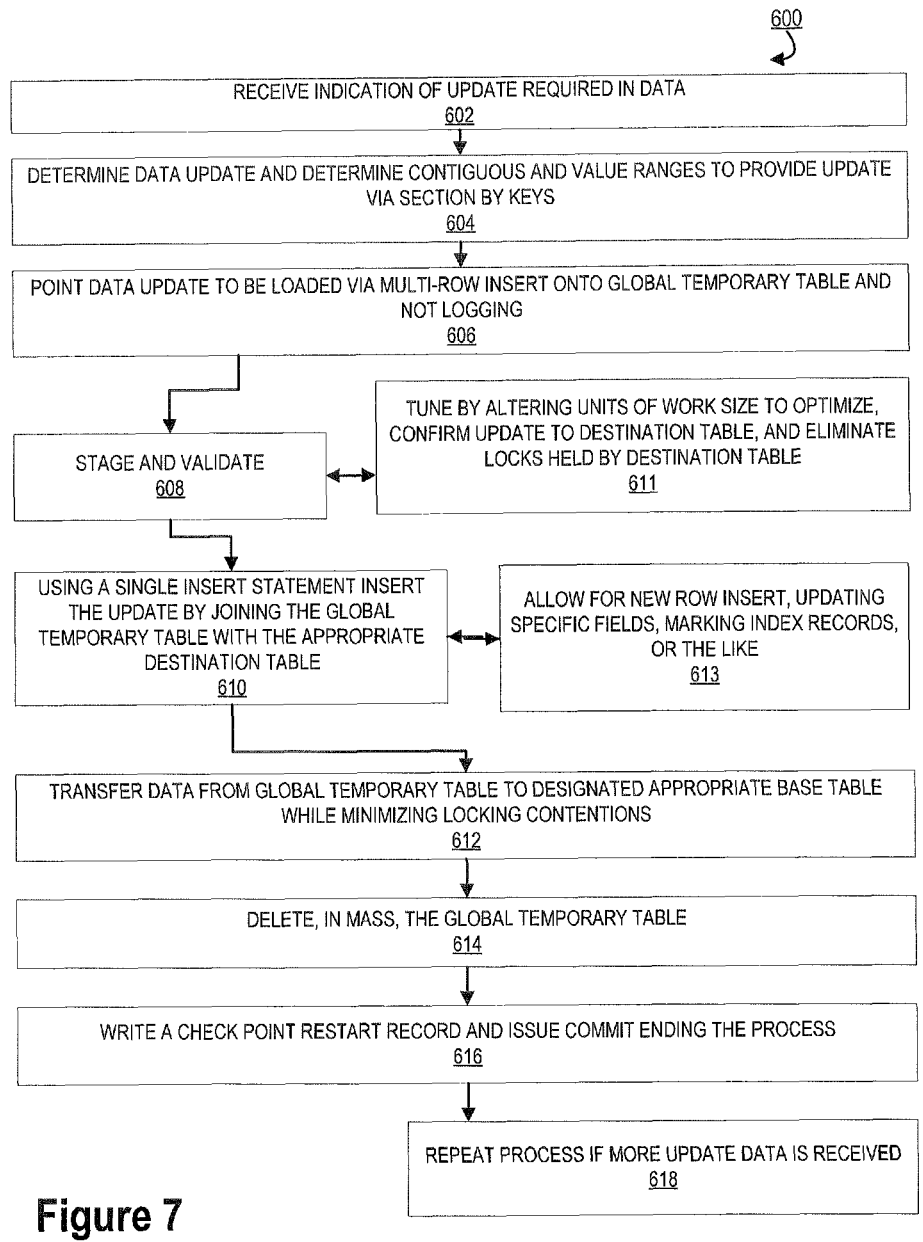
Figure 8A:
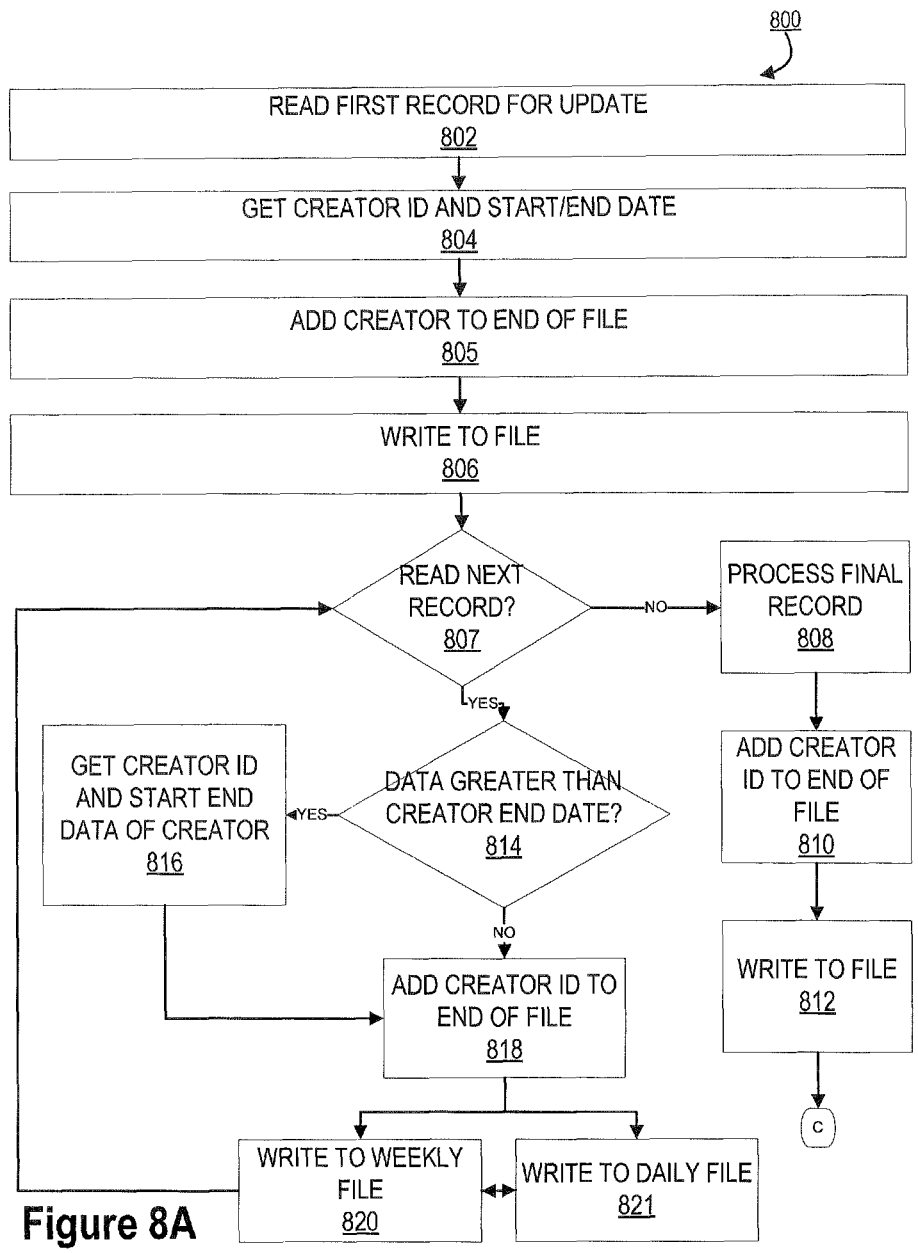
Figure 8B:
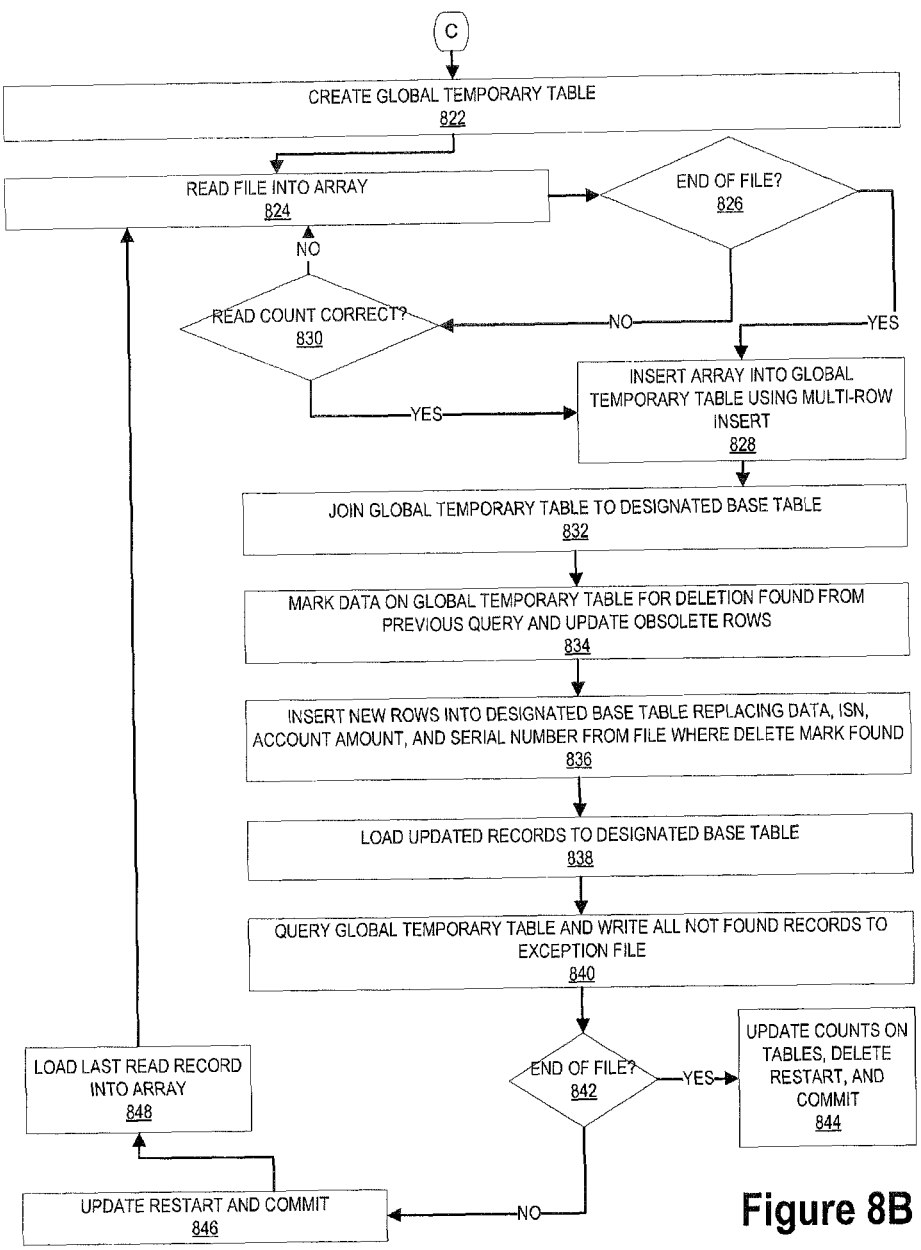

Having thus described embodiments of the invention in general terms, reference will now be made the accompanying drawings, wherein:

FIG. 1 provides a high level process flow illustrating the process of using multi-row database data loading for enterprise workflow applications, in accordance with embodiments of the invention;

FIG. 2 provides a high level process flow illustrating the process of using multi-row database updating for enterprise workflow applications, in accordance with embodiments of the invention;

FIG. 3 provides an illustration of a multi-row database loading and updating computing system environment, in accordance with various embodiments of the invention;

FIG. 4 provides an illustration of a data flow through the system for loading and updating data, in accordance with an embodiment of the invention;

FIG. 5 provides a detailed process flow illustrating the process of using multi-row database data loading for enterprise workflow applications, in accordance with embodiments of the invention;

FIG. 6A illustrates a detailed decision process flow illustrating the process of using multi-row database data loading for enterprise workflow applications, in accordance with embodiments of the invention;

FIG. 6B illustrates a continued detailed decision process flow illustrating the process of using multi-row database data loading for enterprise workflow applications, in accordance with embodiments of the invention;

FIG. 6C illustrates a continued detailed decision process flow illustrating the process of using multi-row database data loading for enterprise workflow applications, in accordance with embodiments of the invention;

FIG. 7 provides a detailed process illustrating the process of using multi-row database updating for enterprise workflow applications, in accordance with embodiments of the invention;

FIG. 8A illustrates a detailed decision process flow illustrating the process of using multi-row database updating for enterprise workflow applications, in accordance with embodiments of the invention; and FIG. 8B illustrates a continued detailed decision process flow illustrating the process of using multi-row database updating for enterprise workflow applications, in accordance with embodiments of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

Furthermore, embodiments of the present invention use the term "user." It will be appreciated by someone with ordinary skill in the art that the user may be an individual, financial institution, corporation, or other entity that may provide or require electronic data, software, and/or the like that may be stored.

Although some embodiments of the invention herein are generally described as involving a "financial institution," one of ordinary skill in the art will appreciate that other embodiments of the invention may involve other businesses that take the place of or work in conjunction with the financial institution to perform one or more of the processes or steps described herein as being performed by a financial institution. Still in other embodiments of the invention the financial institution described herein may be replaced with other types of entities that have data storage needs.

In typical enterprise componentized workflow applications requiring entities to load large amounts of data into tables, such as over 100 million data loads per day, parallel processes are being utilized. In this way, multiple loading processes may be occurring simultaneously within an entity in order to load data onto the appropriate destination table. Furthermore, while loading, a typical database system places a lock on the base table that is being loaded. In this way, until the data is loaded onto the base table, the table and potentially other pages are locked until a commitment is issued. In this way, the database system may lock pages do to the amount of data being manipulated, thus providing locking contentions.

FIG. 1 illustrates a high level process flow illustrating the process of using multi-row database data loading for enterprise workflow applications 100, in accordance with embodiments of the invention. As illustrated in block 102 of the high level process flow 100, the system may receive data to store in the database. The data may be from the entity, a user, vendor, or the like. For example, this data may include software, hardware, memory, programs, operating systems, programming notes, instructions, output resulting from the use of any software program, including word processing documents, spreadsheets, database files, charts, graphs and outlines, electronic mail or "e-mail," personal digital assistant ("PDA") messages, instant messenger messages, source code of all types, programming languages, linkers and compilers, peripheral drives, PDF files, accounts, identification numbers, PRF files, batch files, ASCII files, crosswalks, code keys, pull down tables, logs, file layouts and any and all miscellaneous files or file fragments, deleted file or file fragment. In accordance with embodiments of the invention, the term "information technology" as used herein refers to the totality of interconnecting hardware and software that supports the flow and processing of information. Information technology include all information technology resources, physical components, and the like that make up the computing, internet communications, networking, transmission media, or the like of an entity.

Next, as illustrated in block 104 the invention utilizes in-memory database tables (or global temporary tables) to stage data to be stored in the database in rows. In some embodiment multiple rows are used within a table. A global temporary table may be a table that is visible to all sessions but the data in the table is only visible to the session that inserts the data into the table. In some embodiments, a user may be able to set the amount of rows or a multiple amount of rows associated with the global temporary table. In other embodiments, the system determines the number of rows based on the amount of data received to store in the database for indexing on a destination base table. In some embodiments, the global temporary table may also have an index created with the table.

Next, as illustrated in block 105, the rows that are to be inserted are grouped into units of work for insertion and processing into the destination base table. Once the units of work have been established, the system validates the groups of units of work within the global temporary table, as illustrated in block 106. In this way, multiple rows may be validated within the temporary table before ever being uploaded and indexed at the base, long term storage table.

Once validated, the system may insert and process the received date from the global temporary table to a designated destination based table, as illustrated in block 108. The designated base table may be one or more tables in which the system, user, entity, or the like may have selected for long term storage and indexing. In some embodiments, the designated base table may be one or more tables in which the data, based on the type of data, designates the designated base table.

As illustrated in block 110, once the received data is inserted and processed from the global temporary table to the designated base table, the system checks for referential integrity errors or other errors associated with either the received data or errors associated with the transfer of the data to the global temporary table and/or transfer from the global temporary table to the designated base table. Because of the mass amount of data associated with uploading to the designated base table, the system may continually check for errors associated with the same.

Finally, as illustrated in block 112, the system writes a checkpoint restart row, issues a commit. The system then deletes the data on the global temporary table in mass upon the successful inserting and processing of all of the data rows from the global temporary table to the designated base table. Then, the process may be continued until the end of the records file.

FIG. 2 illustrates a high level process flow for the process of using multi-row database updating for enterprise workflow applications 300, in accordance with embodiments of the invention. First in the process flow 300, the system receives an indication that an update is required to the data within one or more base tables. The data to be updated may be individual rows within a base table, individual units within the row, or the update may be to an entire table or multiple tables. In some embodiments, the updates may also include inserting new rows with the updated data into the base tables.

Next, as illustrated in block 304, the system may determine the individual data units, rows, or tables that are to be updated. The data to be updated may include, but is not limited to data being marked for index recording, data marked as posted or not posted, specific field updates, data corrections, or the like. After the data for updating is determined, the updates may be processed in groups of units of work, as illustrated in block 306. As such, the update data is processed in rows, such that the update data may be positioned into rows and collectively a group of rows may be processed as a unit of work.

Once the unit of work is processed within the global temporary table, the unit of work is staged and validated, as illustrated in block 308. In this way, the date for updating the base table is staged and validated within the global temporary table prior to being inputting into the base table.

In some embodiments, once the update data is staged and validated in block 308, the global temporary table comprising the updates may be jointed to the destination base table, as illustrated in block 310. In this way, the updated data from the global temporary table may be designated to one or more destination base tables. For example data A in base table B may require updating. The data received for updating data A within base table B is all compiled into a single global temporary table. This global temporary table that has updating data A may then be joined with the correct base table, base table B.

In some embodiments, the invention provides error check and resolution. Specifically, error check and resolution checks for mistakes in the update data, elimination of repeats, confirm proper data to be updated, and the like. In this way, while a high volume of data may be updated daily, this error check ensures that the appropriate data is being updated and correctly processed for indexing.

Finally, as illustrated in block 312, once the data is updated to the appropriate base table, the system writes a checkpoint restart row, issues a commit. The system then deletes the data on the global temporary table in mass upon the successful inserting and processing of all of the data rows from the global temporary table to the designated base table. Then, the process may be continued until the end of the records file.

FIG. 3 provides an illustration of a multi-row database loading and updating computing system environment 200, in accordance with various embodiments of the invention. As illustrated in FIG. 3, the entity server 208 is operatively coupled, via a network 201 to the user system 204, the database indexing system 206, and the vendor system 210. In this way, the entity server 208 can send information to and receive information from the user system 204, user statement management system 206, and the vendor systems 210 to provide expedited multi-row database loading and updating for enterprise workflow applications.

FIG. 3 illustrates only one example of an embodiment of a multi-row database loading and updating computer system environment 200, and it will be appreciated that in other embodiments one or more of the systems, devices, or servers may be combined into a single system, device, or server, or be made up of multiple systems, devices, or servers.

The network 201 may be a global area network (GAN), such as the Internet, a wide area network (WAN), a local area network (LAN), or any other type of network or combination of networks. The network 201 may provide for wireline, wireless, or a combination wireline and wireless communication between devices on the network.

In some embodiments, the user 202 is an individual that has, receives, generates, or creates data that may require long term storage and indexing within a database of an entity. As such, in some embodiments, the user 202 may be an individual associated with the entity, such as an employee, agent, independent contractor, or the like acting on behalf of the entity. In other embodiments, the user 202 may be a merchant, vendor, or the like conducting business with the entity. In yet other embodiments, the user 202 may be an individual customer of the entity, such as a customer of a financial institution having accounts, financial data, or the like with the entity.

In this way, multiple individuals or entities may comprise a user 202 such that the user 202 may receive, create, or generate data that the entity may require for long term storage and indexing. In some embodiments, the data may be required to be stored based on regulations, based on a line needs, legal concerns, customer needs, user 202 requests, or the like. In some embodiments the data may be financial institution or financial account data associated with a customer of the entity. In this way, in other embodiments, the user 202 may be an individual customer of the entity.

As illustrated in FIG. 3, the entity server 208 may include a communication device 246, processing device 248, and a memory device 250. The processing device 248 is operatively coupled to the communication device 246 and the memory device 250. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device. The processing device 238 uses the communication device 246 to communicate with the network 201 and other devices on the network 201, such as, but not limited to the user system 204, vendor system 210, and/or database indexing server 206 over a network 201. As such, the communication device 246 generally comprises a modem, server, or other device for communicating with other devices on the network 201.

As further illustrated in FIG. 3, the entity server 208 comprises computer-readable instructions 254 stored in the memory device 250, which in one embodiment includes the computer-readable instructions 254 of an insert application 258. In some embodiments, the memory device 250 includes data storage 252 for storing data related to the insert application 258 including but not limited to data created and/or used by the insert application 258. In some embodiments, the entity server 208 comprises computer-readable instructions 254 stored in the memory device 250, which in one embodiment includes the computer-readable instructions 254 of an update application 256. In some embodiments, the memory device 250 includes data storage 252 for storing data related to the update application 256 including but not limited to data created and/or used by the update application 256.

In the embodiments illustrated in FIG. 3 and described throughout much of this specification, the insert application 258 allows for multi-row database data insertion for enterprise workflow applications. The insert application 258 provides for multi-row database data insertion for enterprise workflow applications by receiving data for insertion, requesting or creating new global temporary tables for the received data, stage the data for insertion to a base table by inserting load data onto the created global temporary table via rows, validate the insertion data on a global temporary table, insert and process the data from the global temporary table to a selected base table, check for errors, delete the data from the global temporary table, and issuing a new restart record for the process.

In some embodiments, the insert application 258 receives data for insertion into a base table for database storage, for long term indexing with the ability to search for the data within the entity at a later date. The data may be received via the network 201 from user systems 204, vendor systems 210, or other locations that the entity determines to have data that may be required to be stored at the entity for long term indexing or the like. Typically, the data is received in any of a variety of formats by the communication device 246 of the entity server 208. The insert application 258 may take the received data and convert it to the appropriate format for subsequent long term database storage on a base table. In some embodiments, this format may be any readable information technology format such as text, image, zipped data, SQL, or another computer readable format for storage.

In some embodiments, the insert application 258 may request or create new global temporary tables for the received data. As such, the insert application 258 may receive the data for insertion and utilize multi-row insert to add the data to a global temporary table prior to inserting all of the data onto the base table. In some embodiments, the insert application 258 may create a new global temporary table for insertion. In other embodiments, the insert application 258 may receive a new global temporary table from the database indexing server 206 or other system associated with the network 201.

In some embodiments, the insert application 258 may then stage the data for insertion into the base table on the newly created or received global temporary table. Inserting the data onto the global temporary table may be done via individual rows, single data inputs, or using multi-row inserts. In this way, in some embodiments multiple rows may be inserted on the global temporary table at a single time. In other embodiments, a single row may be inserted on the global temporary table at a single time. In yet other embodiments, a single data unit may be inserted on the global temporary table at a single time. In this way, the insert application 258 uses computer readable instructions 254 to insert data, whether a single unit, single row, or multi-row, to insert data onto the global temporary table to stage the data for mass insertion into a base table. In some embodiments, the global temporary table, while data is being inserted, may be stored within the data storage 252 of the entity server 208.

Next, the insert application 258 may validate the inserted data on the global temporary table. In this way, the insert application 258 may review the received data for insertion and make sure there are no redundancies, inconsistencies, or format issues associated with the data on the global temporary table.

The insert application 258 may then insert and process the data from the global temporary table to a selected base table. As such, the insert application 258 commands an insert into/select from SQL statement to move the contents of the global temporary table to the appropriate base table. In some embodiments, the appropriate base table may be selected by the user 202, the entity, the data itself, or the like. The appropriate base table may be located within the database indexing server 206. The entity may determine the appropriate base table and determine the appropriate base table. Furthermore, in some embodiments, the data is inserted in mass from the global temporary table to the base table. In this way, the base table is not disturbed and locked when a single row must be added to the base table. Instead, this invention allows for multiple rows (in fact, an entire table if necessary) to be loaded to a base table without the locking or delay that occurs when individual or multiple rows are added directly to the base table by first adding all of the data to a global temporary table. The data from the global temporary table may then be added, in its entirety to the designated base table.

Once the insert application 258 inserts or loads the data from the global temporary table to the base table, the insert application 258 checks for errors in the loading process. In this way, the insert application 258 may monitor for Referential Integrity (RI) errors that may have occurred during the final insert of data from the global temporary table to the destination base table. If the insert application 258 recognizes an RI error and will institute a series of update statements to resolve the error.

Once the insert application 258 has successfully inserted the data from the global temporary table to the base table, the rows of data in the global temporary table are deleted in mass. As such, the data storage 252 within the entity server 208 may be freed up to restart the process using the newly open global temporary table. As such, the insert application 258 may issue a new restart record to restart the process if more data is to be loaded. In some embodiments, multiple global temporary tables may be loaded within an entity at any given time. As such, simultaneously running a system of inserting data to a global temporary table and loading that data onto an appropriate base table.

In the embodiments illustrated in FIG. 3 and described throughout much of this specification, the update application 256 allows for multi-row database base table updates for enterprise workflow applications. The update application 256 provides for multi-row database data updating for enterprise workflow applications by receiving an indication of data for updating, requesting or creating new global temporary tables for the update data, stage the data for insertion to a base table by inserting update date onto the created global temporary table via rows, validate the update data on a global temporary table, insert and process the update data from the global temporary table to the appropriate base table, check for errors, delete the data from the global temporary table, and issuing a new restart record for the process.

The update application 256 may receive an indication that data in one or more base tables may need to be updated. The indication may be received by a user 202, vendor, database indexing server 206, or other indication means, via the network 201. The updates may for data that is stored in base tables or index records. The updates may include data marking for index records, posting/un-posting, flag/un-flag, specific field update (such as, but not limited to account corrections, amount corrections, or the like), insertion of new rows within a base table with updated data, and/or the like. Typically, the data is received in any of a variety of formats by the communication device 246 of the entity server 208. The update application 256 may take the received data and convert it to the appropriate format for subsequent long term database storage on a base table. In some embodiments, this format may be any readable information technology format such as text, image, zipped data, SQL, or another computer readable format for storage.

In some embodiments, the update application 256 may request or create a new global temporary table to stage the update data prior to inserting the update data on the base table. As such, the update application 256 may receive the update data for insertion and updating of a base table by utilize multi-row insert to add the data to a global temporary table prior to inserting all of the data onto the base table. In some embodiments, the update application 256 may create a new global temporary table for insertion. In other embodiments, the update application 256 may receive a new global temporary table from the database indexing server 206 or other system associated with the network 201.

Next, the update application 256 may stage the data for insertion to a base table by inserting the update data onto a created global temporary table via row insert. In some embodiments, the update application 256 may inserting the update data onto the global temporary table via individual rows, single data inputs, or using multi-row inserts. In this way, in some embodiments, multiple rows may be inserted on the global temporary table at a single time. In other embodiments, a single row may be inserted on the global temporary table at a single time. In yet other embodiments, a single data unit may be inserted on the global temporary table at a single time. In this way, the update application 256 uses computer readable instructions 254 to insert data, whether a single unit, single row, or multi-row, to insert update data onto the global temporary table to stage the data for mass insertion into a base table. In some embodiments, the global temporary table, while update data is being inserted, may be stored within the data storage 252 of the entity server 208.

Next, the update application 256 may validate the update data that has been inserted on the global temporary table. In this way, the update application 256 may review the received data for updating and determine the appropriate base table for updating. In this way, the update application 256 may determine the appropriate global temporary table to position the data, such that the appropriate base table receives the update data. Furthermore, the update application 256 may make sure there are no redundancies, inconsistencies, or format issues associated with the data on the global temporary table. In some embodiments, the update application 256 groups data for updating one base table on the same global temporary table.

The update application 256 may then insert and process the update data from the global temporary table to the base table that has the data that needs updated stored therein. As such, the update application 256 commands an insert into/select to move the contents of the global temporary table to the base table that requires the update. In this way, the update data may be pointed to the appropriate base table that has the data that requires update. Furthermore, in some embodiments, the update data is inserted in mass from the global temporary table to the base table. In this way, the base table is not disturbed and locked when an update is necessary. Instead, this invention allows for multiple rows (in fact, an entire table if necessary) to be updated with new dated loaded to a base table without the locking or delay that occurs when individual or multiple rows are updated directly. This is done via using the global temporary table to first state all update data for that base table and inserting all update data at a single time, instead of individually inserting each of the updates to the base table when an update is received.

In some embodiments, the update application 256, once the update data is loaded from the global temporary table to the base table, the update application 256 checks for errors in the loading process. In this way, the update application 256 may monitor for errors in updating the data, such as updating the wrong data, flagging data incorrectly, inserting rows incorrectly, or the like.

Once the update application 256 has successfully inserted the update data from the global temporary table to the appropriate base table, the rows of data in the global temporary table are deleted in mass. As such, the data storage 252 within the entity server 208 may be freed up to restart the process using the newly open global temporary table. As such, the update application 256 may issue a new restart record to restart the process if more data is to be updated. In some embodiments, multiple global temporary tables may be loaded within an entity at any given time. As such, simultaneously running a system of inserting data to a global temporary table and loading that data onto an appropriate base table.

As illustrated in FIG. 3, the database indexing server 206 generally comprises a communication device 236, a processing device 238, and a memory device 240. The processing device 238 is operatively coupled to the communication device 236 and the memory device 240. The processing device 238 uses the communication device 236 to communicate with the network 201 and other devices on the network 201, such as, but not limited to, the entity server 208, the vendor system 210, and the user system 204. As such, the communication device 236 generally comprises a modem, server, or other device for communicating with other devices on the network 201.

As further illustrated in FIG. 3, the database indexing server 206 comprises computer-readable instructions 242 stored in the memory device 240, which in one embodiment includes the computer-readable instructions 242 of an indexing application 244. In some embodiments, the memory device 240 includes database storage for storing data related to the indexing application 244 including but not limited to data created and/or used by the indexing application 244.

In the embodiments illustrated in FIG. 3 and described throughout much of this specification, the indexing application 244 allows for creation of global temporary tables, removing data from used global temporary tables for reuse, storage of base tables, and indexing for search tables, and monitoring of tables on the database for updating and the like.

In some embodiments the indexing application 244 creates global temporary tables for insertion of data for loading or updating. A global temporary table may be a table that is visible to all sessions but the data in the table is only visible to the session that inserts the data into the table. In some embodiments, a user 202 may be able to access the indexing application 244 and set the amount of rows or a multiple amount of rows associated with the global temporary table. In other embodiments, the database indexing server 206 determines the number of rows based on the amount of data received for loading or updating on a base table. In some embodiments, the global temporary table may also have an index created with the table. In some embodiments, the global temporary table may have the capabilities to accept and stage multi-row insert of data. The global temporary table may also be a table such as a relational database table or flat file database table. These tables include sets of data values that are organized into columns and rows. Tables typically have a specified number of columns, but rows may vary. Each row may be identified by the values appearing in a particular column subset with may be identified as a unique key index. In this way, the tables may provide for indexing of data that is searchable and accessible to any individual within the entity.

In some embodiments, the indexing application 244 may remove the data from a global temporary table in mass, such that the global temporary table may be reused and reprogramed for subsequent loads and updates. As such, the indexing application 244 may make sure that all of the data has been placed into a base table and is accurately placed therein. Once determined, the indexing application 244 will delete the data on the global temporary table such that it can be reused if necessary.

In some embodiments, the indexing application 244 may provide for entity storage and indexing functionality for base tables associated with the entity. As such, the indexing application 244 stores, within the memory device 240 the base tables for the entity. Furthermore, the indexing application 244 authorizes and allows access to the data on the base tables. In this way, the indexing application 244 may authorize a user 202 or vendor to access data or deny that user 202 or vendor access based on predetermined access criteria.

In this way, the indexing application 244 allows for access to and searching of based tables and global temporary tables based on user 202 authorization. In this way, the data may be indexed by the indexing application 244 such that it is searchable for an individual or user 202 associated with the entity to easily access the data and retrieve it.

The indexing application 244 may, in some embodiments, monitor the tables on the database. This monitoring may include monitoring data for updates, monitoring for user 202 access, security functions such as monitoring for security breaches or unauthorized access to the data.

FIG. 3 also illustrates a user system 204. The user system 204 is operatively coupled to the entity server 208, vender system 210, and/or the database indexing server 206 through the network 201. The user system 204 has systems with devices the same or similar to the devices described for the entity server 208 and/or the database indexing server 206 (e.g., communication device, processing device, and memory device). Therefore, the user system 204 may communicate with the entity server 208, vendor systems 210, and/or the database indexing server 206 in the same or similar way as previously described with respect to each system. The user system 204, in some embodiments, is comprised of systems and devices that allow for sending and receiving data for loading or updating from a user 202 and/or information associated therewith. A "user device" 204 may be any mobile or computer communication device, such as a cellular telecommunications device (e.g., a cell phone or mobile phone), personal digital assistant (PDA), a mobile Internet accessing device, or other mobile device including, but not limited to portable digital assistants (PDAs), pagers, mobile televisions, gaming devices, laptop computers, desktop computers, cameras, video recorders, audio/video player, radio, GPS devices, any combination of the aforementioned, or the like. Although only a single user system 204 is depicted in FIG. 3, the system environment 200 may contain numerous user systems 204, as appreciated by one of ordinary skill in the art.

FIG. 3 also illustrates a vendor system 210. The vendor system 210 is operatively coupled to the entity server 208, user system 204, and/or the database indexing server 206 through the network 201. The vendor system 210 has systems with devices the same or similar to the devices described for the entity server 208 and/or the database indexing server 206 (e.g., communication device, processing device, and memory device). Therefore, the vendor system 210 may communicate with the entity server 208, user system 204, and/or the database indexing server 206 in the same or similar way as previously described with respect to each system. The vendor system 210, in some embodiments, is comprised of systems and devices that allow for sending and receiving vendor information and/or entity information across the network 201. In this way, the vendor system 210 may send data to the entity server 208 for storage within the database indexing server 206. Furthermore, the vendor system 210 may be able to access data from the database indexing server 206, if authorized, using the network.

FIG. 3 depicts only one vendor system 210 within the computing system environment 200, however, one of ordinary skill in the art will appreciate that a plurality of vendor systems 210 may be communicably linked with the network 201 and the other devices on connected to the network 201, such that each vendor system 210 is communicably linked to the network 201 and the other devices on the network 201.

FIG. 4 illustrates a flow of data through the system for loading and updating data 700, in accordance with an embodiment of the invention. The data may be received at the entity system 208 from one or more of a user systems 204, vendor systems 210, or the like. In some embodiments, the data may be financial institution data, entity data, customer data, user 202 data, or the like. Financial institution data may include one or more of account information, transaction information, or other financial data associated financial institutions, such as if the entity is a financial institution.

The data may be sent from a user system 204, vendor system 210, or the like to the entity server 208. In some embodiments, the data may be sent from a user 202 or vendor based on the user 202 or vendor indicating that the data should be stored in a base table for indexing. In other embodiments, the system may determine what data may or may not be necessary to be stored on long term storage or indexing.

Next, once the entity server 208 receives the data from one or more of a user system 204, vendor system 210, or the like, the entity server 208 may, in coordination with the database indexing server 206 determine the type of data received, such that the data may be directed to the appropriate base table 706. For example, the data may relate to updates to a specific type of data. As such, the entity server 208 in connection with the database indexing server 206, may determine the base table 706 that has that type of data stored within.

Once the data is categorized such that the appropriate base table to direct the data is determined, the entity server 208 may direct the data to an appropriate global temporary table 702. In this example, the entity server 208 may direct the load or update data to one of three global temporary table 702. As such, in this example the entity server 208 may direct the data to one of the three global temporary tables 702 depending on the base table that the data may be directed to.

As illustrated in block 704, the system may then load the data to the appropriate base table 706. In some embodiments, the system may load the data to the appropriate base table 706 when the global temporary table 702 has been filled with multi-row insertion of data for loading or uploading. As such, the system may direct the data from the appropriate global temporary table 702 to the appropriate base table 706 such that the base table 706 may be loaded or updated with the appropriate data.

FIG. 5 illustrates a detailed process flow for the process of using multi-row database data loading for enterprise workflow applications 400, in accordance with embodiments of the invention. As illustrated in block 402, the system presents a global temporary table for loading data for insertion or data load into a base table. Next, as illustrated in block 404, the system loads the temporary table with the data for insertion. The loading utilizing multi-row insert functionality.

At this point, the data does not have to be logged, which is typically required when loading data using multi-row insert. Instead, by using a global temporary table, the data being loaded via multi-row insert is not logged, as illustrated in block 406. Next, as illustrated in block 408, the appropriate base table to insert the data from the global temporary table is determined. In some embodiments, the system may determine the appropriate base table. In other embodiments, the user 202, vendor, or entity may determine the appropriate base table. In yet other embodiments, the appropriate base table is determined by the data loaded on the global temporary table. When determining the appropriate base table, the system may check for conflicts and duplicates associated with the data loaded onto the global temporary table, as illustrated in block 411. If a duplicate or conflict is determined, then the system rectifies the duplicate or conflict.

As illustrated in block 410 of FIG. 5, using a single insert statement the system may insert the data from the global temporary table onto the appropriate base table. Once inserted, the system may provide restart capabilities to the process if process abandonment occurs, as illustrated in block 413. Finally, as illustrated in block 412, the data is transferred from the global temporary table to the designated appropriate base table while minimizing locking contentions that may arise. If other errors occur at final insertion, such as Referential Integrity (RI) errors or the like, the system may also provide for update statements to resolve the error.

This process 400 provides several key components and performance benefits over traditional table loading processes. First, the internal global temporary tables are created at insert program startups and are not logged by the database system, as described above in block 406. As such, this improves the singleton insert processing. Next, the load data is validated by the program during insert to the global temporary table. In this way, the process 400 thereby eliminates locks that are normally held on the destination table, as described above in block 412. Furthermore, the final insert process is optimized by writing global temporary table rows to a contiguous area of the destination base table when defined without any free space. As such, the entire area of destination base table may be filled using the data from the global temporary table. Thus loading large amount of data into a contiguous area on the base table quickly and effectively.

Furthermore, the single insertion statement that inserts the data from the global temporary table onto the appropriate base table, as described about in block 410, is tuned by altering the unit of work size to optimize the data and workload characteristics. The process minimizes locking contentions (illustrated in block 412) by locking on destination tables at the very end of each unit of work. In this way the process minimizes the locking contentions with other read/write activity.

As described above, if errors such as Referential Integrity (RI) errors occur the system may also provide for update statements to resolve the error. However, in the process 400 RI errors only occur during final insert. There are only two types that may occur, including key duplicates and true duplicates. Key duplicates occur when a unique key from the base table is present on the global temporary table. True duplicates occur when an entire row from the base table is present on the global temporary table. These RI errors may be corrected in the process 400. Key duplicates are resolved using a single update statement against the global temporary table using SQL existence sub-select from the base table. True duplicates are resolved via a single update statement marking all duplicate rows in the global temporary tables as obsolete using a SQL existence sub-select from the base table. Finally, RI duplicates can be prevented within a unit of work by presorting the input data and defining a unique index on the global temporary table that matches the unique key of the base table.

FIG. 6A, FIG. 6B, and FIG. 6C illustrate a detailed decision process flow for the process of using multi-row database data loading for enterprise workflow applications 500, in accordance with embodiments of the invention. As illustrated in block 502 of FIG. 6A, the process first connects to the system and displays a compile and run stamp for initiating the process. Next, as illustrated in block 503 the system reads the parameters from the data received and creates a global temporary table for the data batch for data insertion and loading. Next, as illustrated in block 504, a read of the input data and increment read count is completed for the batch is completed for data insertion and loading. In this way, a batch of data is received that requires loading onto a destination base table. The data is read and parameters from the batch are determined and prepped for insertion.

As illustrated in decision block 506, an insert program execution is initiated into a restart table. The restart table is an already running program that monitors where the system is now and monitors the activity incase restart or new process may be required. The restart table comprises one or more counters, location monitoring, activity monitoring, or the like. In some embodiments, the restart table is a standalone table for reestablishing positions and process running. Next, it is determined if the SQL code condition is satisfactory, as illustrated in block 508. If the SQL code is not satisfactory, for example, if it is negative 803 or the like, then as illustrated in block 510 a query restart table for already processed record or batch count from the existing rows. Then, the system reads the input file and incremental read count of the batches with unsatisfactory SQL condition, as illustrated in block 512. Next, in decision block 514 it is determined if the read count is greater than the processed count. If the read count is not greater than the processed count the process flows back to block 512 to read input file and increment read count. If the read count is greater than the processed count, the commit quantity, source code, and array quantity is received from the control or base table, as illustrated in block 516. Furthermore, referring back to decision block 508, if the SQL code condition is satisfactory, such as 0, then the process flows directly to block 516 to get commit quantity, source code, and array quantity from the control or base table.

This process 500, is continued at FIG. 6B. At decision block 518, the system checks to determine if the batch or file is at the end. If the file is at the end, then as illustrated in block 521 the system updates control or base tables with the data from the global temporary table, delete the restart tables, issue commits, display counts, and disconnect from the system. If it was determined in decision block 518 that it wasn't the end of the file, then the system goes to decision block 522 to determine if the array is satisfactory. If the array is not satisfactory the system checks first for key duplicates, as illustrated in decision block 534. In this way, it is determined if an error occurred in the loading of the batch data via multi-row insert onto the global temporary tables the errors may be corrected prior to uploading. Key duplicates occur when a unique key from the base table is present on the global temporary table. If there are no key duplicates found, the system populates the array variables with the current record or batch, as illustrated in block 528. As such, the system prepares to load the data onto the global temporary table. If key duplicates are determined to exist in decision block 524, then the system determines if true duplicates exist, as illustrated in decision block 526. True duplicates occur when an entire row from the base table is present on the global temporary table. If true duplicates are not found, the system processed to populate the array variables with current records or batch data, as illustrated in block 528. Next, the current record is moved to previous record variables, as illustrated in block 530. Once the current record is moved to the previous record variables or if there are true duplicates in decision block 526, the system may read the next record, as illustrated in block 531.

As illustrated in block 534 of FIG. 6B, the global temporary table is loaded using the batch data from the array, using multi-row insert. As such, if the array was satisfactory in decision block 522 or after the next record is loaded in block 532, the global temporary table is loaded using the batch data from the array.

Next, as illustrated in decision block 535, the system determines if the unit is greater than the commit. If not, then the process is terminated. If the unit is greater than the amount commit, then, as illustrated in block 536 the base table is loaded from the global temporary table.

This process 500, is continued at FIG. 6C. As illustrated in decision block 538 the system determines if the SQL code condition is satisfactory. If the SQL code condition is satisfactory, such as 0 then the restart table is updated and the unit of work or batch data is tracked, as illustrated in block 540. Next, it is determined if this is the end of the file, as illustrated in decision block 543. If yes, then the update control or base tables are updated, the restart table is deleted, a commit is issued, the counts are displayed, and the process is disconnected from the system, as illustrated in block 546. If it is not determined that this is the end of file, as illustrated in decision block 543, then the creator ID is fetched and the key is adjusted for the last record, as illustrated in block 544. Next, the process converts back to decision block 518 of FIG. 6B and the process is continued.

If the SQL code condition is not satisfied in decision block 538, then one of two processes may occur. If the SQL code condition is any condition other than 0 or negative 803, then a system amendment is performed, as illustrated in block 548. If the SQL code condition is negative 803, which indicates that a duplicate was found, then the base table and the global temporary table are joined to fetch all key duplicate roes in a cursor, as illustrated in block 550. Next, in decision block 552, a decision is made if the end of the cursor has been reached. If the end of the cursor has been reached, the base table is loaded with the data from the global temporary table, as illustrated in block 554. The process 500 may then flow back to decision block 538.

If, in decision block 552, a decision is made that the end of the cursor has not been reached, the process may fetch from the cursor, as illustrated in block 556. Next, the system may determine if true duplicates exist, in decision block 558. If there are true duplicates, the global temporary table is updated for the row as the true duplicate row, as illustrated in block 560. If no true duplicates exist, the key is adjusted, as illustrated in block 562. The updated global temporary table or adjusted key are then checked again to determine if it's the end of the cursor at decision block 552. Ultimately, through the process 500, the base tables will be loaded with load data by first inserting the data onto global temporary tables using multi-row insert, then all of the data on the global temporary table is loaded onto the base table. As such the control or base table is updated, the restart table is deleted, a commit is issued, the counts are displayed, and there is a disconnection from the system (such as illustrated in block 546).

FIG. 7 illustrates a detailed process for the process of using multi-row database updating for enterprise workflow applications 600, in accordance with embodiments of the invention. As illustrated in block 602, the system receives an indication of updates required in data on a base table. Next, as illustrated in block 604, the system may determine data update and determine contiguous and value ranges to provide the update via sections by keys. Next, the system may point the data update to be loaded to a specific base table via multi-row insert onto global temporary tables, as illustrated in block 606. At this point, the data does not have to be logged, which is typically required when updating data using multi-row insert. Instead, by using a global temporary table, the data being loaded via multi-row insert is not logged, as illustrated in block 606.

The data may then be staged and validated on the global temporary table, in anticipation of adding the data to the base table, as illustrated in block 608. The system may tune the staging and validation by altering units of work size to optimizes confirm updated to destination table, as illustrated in block 611. Thus eliminating locking that may occur when uploading update data to the designated base table.

Using a single insert statement insert, the system may insert the update data by joining the global temporary table with the appropriate destination table, as illustrated in block 610. The system update data may also allow for new row insertion, updating specific fields, marking index records, or the like, as illustrated in block 613.

As illustrated in block 612, the update data is transferred from the global temporary table to the appropriate base table, based on the update data. This transfer minimizes locking contentions, as described above with respect to block 611. Once the transfer of data is complete, the update data on the global temporary table is deleted in mass, as illustrated in block 614. A check point restart record is written and an issue commit ending the process is activated, as illustrated in block 616. Finally, the process may be repeated if more update data is received and needs to be implemented onto a base table, as illustrated in block 618.

This process 600 provides several key components and performance benefits over traditional table updating processes. First, the internal global temporary tables are created at the update program start up and are not logged by the database system, as illustrated in block 606. As such this improves the singleton insert processing. Next, the update data is validated by the program during insert to the global temporary table. In this way, the process 600 thereby eliminates locks that are normally held on the destination table, as described above in block 611. Furthermore, the single insertion statement that inserts the update data from the global temporary table onto the appropriate base table, as described about in block 612, is tuned by altering the unit of work size to optimize the data and workload characteristics. Next, locking on the destination base table is held to the very end of each unit of work processing. As such, minimizing contentions with other read/write activities occurring within the entity's information technology infrastructure. Finally, the update data may be sorted into the appropriate index order allowing a more continuous update/insert of the base table.

FIG. 8A and FIG. 8B illustrate a detailed decision process flow for the process of using multi-row database updating for enterprise workflow applications 800, in accordance with embodiments of the invention. As illustrated in block 802, the process 800 begins by reading the first record for updating. A record may be one or more single data units, rows of data, or tables of data that may require updating. The process 800 continues by adding information associated with the update and initial writing of the update to a file. Next, as illustrated in block 804 the creator ID is received and a start/end date is determined. Then, the updated is written to a file, as illustrated in block 806.

Next, as illustrated in decision block 807, the system determines if there is more update data to be processed, such as a second record or the like. If there is a next record, such as a second record, system determines in decision block 814 if the data in the record is greater than the creator end data. If the data is greater than the creator end data, then the system gets the creator ID and start/end data of the creator, as illustrated in block 816. Next, the system adds the creator ID to the end of file, as illustrated in block 818. Furthermore if the data in the record is greater than the creator end data in decision block 814, then the system adds the creator ID to the end of the file, in decision block 818. The process 800 continues to write the update data to a weekly update file, in block 820 or a daily update file in block 821. In this way, the system may determine if the update is required today or on a daily bases, in which case that update data will be written to the daily update file. In other embodiments, the system may determine that the update is only required weekly, in which case that update data will be written to the weekly update file.

If there is no next record in decision block 807, the process 800 proceeds to process the final record, as illustrated in block

808. Next, as illustrated in block 810, the creator ID is added to the end of the file. Then the update is written to the file, as illustrated in block 812.

This process 800, is continued at FIG. 8B. As illustrated in block 822 of FIG. 8B, the process 800 continues by creating a global temporary table to add the updated data file to. Next, the files are read into one or more arrays, as illustrated in block 824. Next, a decision is made in decision block 826 whether the end of the file has been reached. If the end of the file has been reached, then the process continues to insert the array into the global temporary table using multi-row insert, as illustrated in block 828. If it is determined that the end of the file has not been reached in decision block 826 then the system determines in decision block 830 whether the read count was correct. If the read count was not correct in decision block 830, then the process 800 goes back to read the file into an array, as illustrated in block 824. If the read count is correct in decision block 830 then the array is inserted into the global temporary table using multi-row insert, as illustrated in block 828.

As illustrated in block 832 of FIG. 8B, the global temporary table is joined to the destination base table using old data and an old Internal Sequencing Numbers (ISN). While the global temporary table housing the updates is joined to the designated base table, at this point no update data is loaded to the designated base table, the data on the global temporary table for deletion is found from previous query and updated as obsolete rows, as illustrated in block 834.

Next, as illustrated in block 836 of FIG. 8B an insert of new rows into the destination base table occurs. The insertion of new rows (or individual data points) replaces the original data, ISN, account data, and serial number from the data previously in the base table where the delete mark was found. As such, the data or rows that are replaced are only those where the global temporary table has marked for updating.

Next, the updated records are loaded to the destination base table, as illustrated in block 838. Then, a query of the global temporary table is performed and all of the not found records are written as exception files, as illustrated in block 840. In this way, update data is received and the original data on the base table is marked for updating. However, upon insertion the global temporary table cannot locate the original data on the base table that is supposed to be updated. As such, the system may mark the update data as an exception file.

Next, as illustrated in decision block 842, it is determined if the end of file for updating has been reached. If the end of file for updating has been reached, then the counts are updated on the based tables, the restart table is deleted, and a commit is issued, as illustrated in block 844. Subsequently, the data on the global temporary table may be deleted.

If it is determined that the end of the file hasn't been reached in decision block 842, then an update restart and commit is issued in block 846. Next the last read record is loaded into the array, as illustrated in block 848. The process 800, is then continued at block 824 and the file is read into an array.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, or the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational phases to be performed on the computer or other programmable apparatus to produce a computer-implemented process such that the code portions which execute on the computer or other programmable apparatus provide phases for implementing the functions/acts specified in the flowchart and/or block diagram block(s). Alternatively, computer program implemented phases or acts may be combined with operator or human implemented phases or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that phases of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for updating data within an entity database, the system comprising:
   a memory device with computer-readable program code stored thereon;
   a communication device;
   a processing device operatively coupled to the memory device and the communication device, wherein the processing device is configured to execute the computer-readable program code to:
   receive update data for updating original data stored on the entity database, wherein the original data stored on the entity database is stored in base tables and configured in rows;
   identify one or more appropriate base tables with the original data that is to be updated;
   determine a temporary table to store the received update data based at least in part on the appropriate base tables that is identified as storing the original data for updating;
   insert update data onto the temporary table, wherein the insertion of the update data is done by multi-row insertion;
   stage the update data on the temporary table;
   join the temporary table with the appropriate base table, wherein joining the temporary table with the appropriate base table transfers the update data from the temporary table to the appropriate base table;
   confirm that the update data replaced the original data on the appropriate base table; and
   delete, in mass, the update data from the temporary table based at least in part on confirming that the update data replaced the original data on the appropriate base.

2. The system of claim 1, wherein the temporary table is a global temporary table or in-memory database table that is internal to the entity, wherein the temporary table is created at an initiation of updating data within the entity database, wherein the temporary table is not logged by the entity database.

3. The system of claim 1, wherein joining the temporary table with the appropriate base table further comprises replacing the original data in the appropriate base table with the update data from the temporary table in mass, wherein the mass data update reduces locking contentions.

4. The system of claim 1, wherein joining the temporary table with the appropriate base table further comprises a single insertion statement that inserts the update data from the temporary table onto the appropriate base table.

5. The system of claim 1, wherein the processing device is further configured to execute the computer-readable program code to validate the update data when the update data is being inserted onto the temporary table, wherein the validation eliminates locks initiated by the appropriate base table.

6. The system of claim 1, wherein staging the update data on the temporary table includes tuning the update data, such as altering the size of a unit of work associated with the update data to optimize insertion.

7. The system of claim 1, wherein the update data is stored in a weekly or daily update file prior to being inserted onto the temporary table, wherein weekly or daily update files provide the timing for inserting the update data onto the temporary table.

8. The system of claim 1, wherein receiving update data for updating original data stored on the entity database further comprises determining contiguous and value ranges to provide updates by section keys.

9. A computer program product for updating data within an entity database, the computer program product comprising at least one non-transitory computer-readable medium having computer-readable program code portions embodied therein, the computer-readable program code portions comprising:
   an executable portion configured for receiving update data for updating original data stored on the entity database, wherein the original data stored on the entity database is stored in base tables and configured in rows;
   an executable portion configured for identifying one or more appropriate base tables with the original data that is to be updated;
   an executable portion configured for determining a temporary table to store the received update data based at least in part on the appropriate base tables that is identified as storing the original data for updating;

an executable portion configured for inserting update data onto the temporary table, wherein the insertion of the update data is done by multi-row insertion;

an executable portion configured for staging the update data on the temporary table;

an executable portion configured for joining the temporary table with the appropriate base table, wherein joining the temporary table with the appropriate base table transfers the update data from the temporary table to the appropriate base table;

an executable portion configured for confirming that the update data replaced the original data on the appropriate base table; and an executable portion configured for deleting, in mass, the update data from the temporary table based at least in part on confirming that the update data replaced the original data on the appropriate base.

10. The computer program product of claim 9, wherein the temporary table is a global temporary table or in-memory database table that is internal to the entity, wherein the temporary table is created at an initiation of updating data within the entity database, wherein the temporary table is not logged by the entity database.

11. The computer program product of claim 9, wherein joining the temporary table with the appropriate base table further comprises replacing the original data in the appropriate base table with the update data from the temporary table in mass, wherein the mass data update reduces locking contentions.

12. The computer program product of claim 9, wherein joining the temporary table with the appropriate base table further comprises a single insertion statement that inserts the update data from the temporary table onto the appropriate base table.

13. The computer program product of claim 9 further comprising an executable portion configured for validating the update data when the update data is being inserted onto the temporary table, wherein the validation eliminates locks initiated by the appropriate base table.

14. The computer program product of claim 9, wherein staging the update data on the temporary table includes tuning the update data, such as altering the size of a unit of work associated with the update data to optimize insertion.

15. The computer program product of claim 9, wherein the update data is stored in a weekly or daily update file prior to being inserted onto the temporary table, wherein weekly or daily update files provide the timing for inserting the update data onto the temporary table.

16. The computer program product of claim 9, wherein receiving update data for updating original data stored on the entity database further comprises determining contiguous and value ranges to provide updates by section keys.

17. A computer-implemented method for updating data within an entity database, the method comprising:

providing a computing system comprising a computer processing device and a non-transitory computer readable medium, where the computer readable medium comprises configured computer program instruction code, such that when said instruction code is operated by said computer processing device, said computer processing device performs the following operations:

receiving update data for updating original data stored on the entity database, wherein the original data stored on the entity database is stored in base tables and configured in rows;

identifying one or more appropriate base tables with the original data that is to be updated;

determining a temporary table to store the received update data based at least in part on the appropriate base tables that is identified as storing the original data for updating;

inserting, via a computer device processor, update data onto the temporary table, wherein the insertion of the update data is done by multi-row insertion;

staging the update data on the temporary table;

joining the temporary table with the appropriate base table, wherein joining the temporary table with the appropriate base table transfers the update data from the temporary table to the appropriate base table;

confirming that the update data replaced the original data on the appropriate base table; and deleting, in mass, the update data from the temporary table based at least in part on confirming that the update data replaced the original data on the appropriate base.

18. The computer-implemented method of claim 17, wherein the temporary table is a global temporary table or in-memory database table that is internal to the entity, wherein the temporary table is created at an initiation of updating data within the entity database, wherein the temporary table is not logged by the entity database.

19. The computer-implemented method of claim 17, wherein joining the temporary table with the appropriate base table further comprises replacing the original data in the appropriate base table with the update data from the temporary table in mass, wherein the mass data update reduces locking contentions.

20. The computer-implemented method of claim 17, wherein joining the temporary table with the appropriate base table further comprises a single insertion statement that inserts the update data from the temporary table onto the appropriate base table.

21. The computer-implemented method of claim 17, further comprising validating the update data when the update data is being inserted onto the temporary table, wherein the validation eliminates locks initiated by the appropriate base table.

22. The computer-implemented method of claim 17, wherein staging the update data on the temporary table includes tuning the update data, such as altering the size of a unit of work associated with the update data to optimize insertion.

23. The computer-implemented method of claim 17, wherein the update data is stored in a weekly or daily update file prior to being inserted onto the temporary table, wherein weekly or daily update files provide the timing for inserting the update data onto the temporary table.

24. The computer-implemented method of claim 17, wherein receiving update data for updating original data stored on the entity database further comprises determining contiguous and value ranges to provide updates by section keys.

* * * * *